Jan. 31, 1933.  W. A. FLUMERFELT  1,895,846
SHACKLE
Filed Sept. 21, 1931
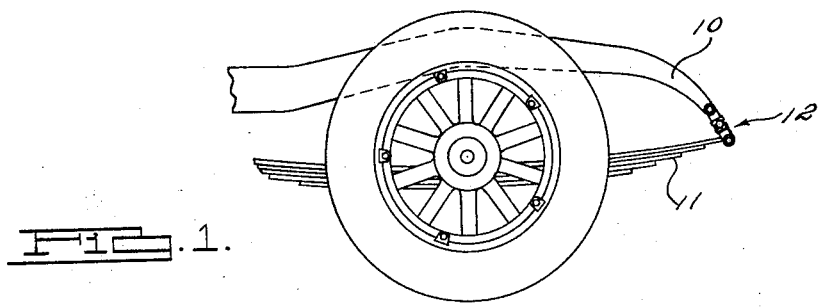
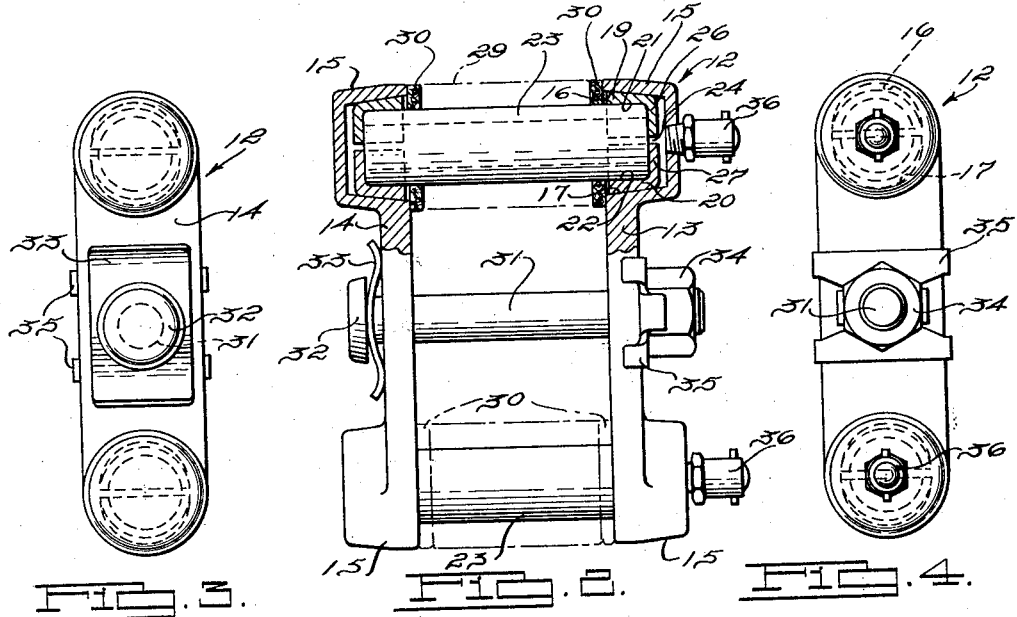
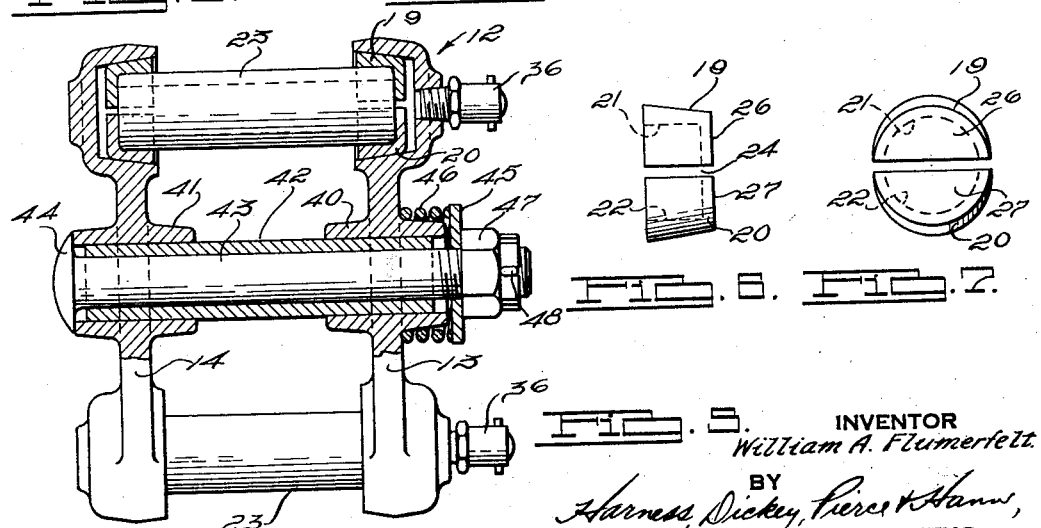
INVENTOR
*William A. Flumerfelt.*
BY
*Harness, Dickey, Pierce & Hanna,*
ATTORNEYS.

Patented Jan. 31, 1933

1,895,846

UNITED STATES PATENT OFFICE

WILLIAM A. FLUMERFELT, OF COLUMBUS, OHIO, ASSIGNOR TO THE COLUMBUS AUTO PARTS COMPANY, A CORPORATION OF OHIO

SHACKLE

Application filed September 21, 1931. Serial No. 563,913.

The invention relates generally to shackles and it has particular relation to a spring shackle such as that used on motor vehicles for connecting an end of a spring to the vehicle chassis.

The principal objects of the invention are to provide a spring shackle of inexpensive construction which will operate uniformly and efficiently over a long period of time without necessitating any manual adjustment or manual take-up; to provide a spring shackle which will counteract and practically eliminate side sway of the vehicle chassis during rocking thereof on the springs; to provide an improved spring shackle in which the pins are mounted in bearings, automatically operating to compensate for any wear during the life of the shackle; and to provide an improved spring shackle in which automatic take-up bearings are utilized for insuring a large bearing contact with the pins at all times.

For a better understanding of the invention reference may be had to the accompanying drawing forming a part of the specification, wherein:

Fig. 1 is a fragmentary view of a motor vehicle illustrating the manner in which the vehicle chassis is connected to a spring by means of a shackle, constructed according to one form of the invention;

Fig. 2 is an enlarged view of the shackle shown by Fig. 1, with parts broken away and shown in cross section, for the purpose of illustrating the manner in which the shackle pins are mounted in the bearings therefor;

Fig. 3 is an end view of the construction shown by Fig. 2, taken from the left end thereof;

Fig. 4 is an end view of the construction shown by Fig. 2, taken from the right end thereof;

Fig. 5 is a view similar to that shown by Fig. 2 illustrating another form of the invention;

Fig. 6 is a detail view illustrating the type of bearings utilized in the shackle;

Fig. 7 also is a detail view of the bearing as seen from the right end of the construction shown by Fig. 6.

Referring to Fig. 1, a vehicle chassis is indicated at 10, a spring for supporting the vehicle is illustrated at 11, and a shackle connecting one end of the spring to the adjacent end of the chassis, is indicated at 12. It will be understood that the shackle primarily is utilized for permitting relative movement between the chassis and the spring which is necessary during movement of the vehicle.

Referring now to Fig. 2, the shackle 12 comprises spaced links 13 and 14 which are substantially identical in structure although disposed in opposed relation. At each end, each of the links 13 and 14 is provided with a bearing retaining portion 15 of cup shape, and preferably the bearing recess thus provided is formed in the end of the links by forging the metal and then swaging it while cold. As more clearly shown by Figs. 3 and 4, the recess in the cup portion 15 is defined by diametrically opposed semi-cylindrical walls 16 and 17, with the axes of the cylindrical surfaces converging toward the base of the cup. Hence, in the recess shown and described the diametrically opposed semi-cylindrical surfaces 16 and 17 have the same radius of curvature throughout their axial length, but each semi-cylindrical wall surface is inclined as a whole with respect to the other.

A split bearing is disposed in each of the recesses, and comprises parts 19 and 20 having outer cylindrical surfaces complementary to the cylindrical surfaces 16 and 17 defining the recess. Hence the outer surface of each of the bearing parts is cylindrical although the axes of the respective bearing cylindrical surfaces converge or are angled with respect to each other. From this it should be understood that the outer surface of each of the bearing parts may have full contact with one of the semi-cylindrical surfaces defining the recess in the bearing cup, during a movement of the bearing part toward or from the base of the recess. The bearing parts 19 and 20 are provided with complementary, cylindrically surfaced recesses 21 and 22, together defining a cylindrical recess complementary to and adapted to receive one end of a shackle pin indicated at 23. As initially constructed, the bearing parts are spaced as indicated at 100

24 in Figs. 6 and 7 particularly, to permit movement of the parts toward each other which is necessary to take up wear. It will be appreciated that during such movement of the bearing parts, the semi-cylindrical surfaces 21 and 22 defining the recess for receiving the pin 23, will always be maintained substantially complementary to the pin. At the base end of the recess in the bearing parts, the latter are provided with base portions 26 and 27 adapted to serve as thrust bearings for the end of the pin.

One of the pins 23 connects the end of the chassis 10 to the shackle and ordinarily a sleeve portion on the chassis indicated at 29, will receive the pin between the links 13 and 14. The pin at the opposite end of the shackle correspondingly cooperates with a sleeve portion on the end of the spring. At the ends of the sleeve portions on the chassis and spring, felt washers indicated at 30 are mounted on the pins to prevent dust and other foreign matter from getting into the bearings at opposite ends of the pins.

The links intermediate their ends are connected by means of a bolt 31 having a head 32 engaging a spring plate 33 at the outer side of link 14, and a nut 34 on the opposite end of the bolt, at the outer side of link 13. A lock washer 35 cooperating with the nut 34 and link 13 prevents turning of the nut during operation of the shackle although, of course, it should be understood that the lock washer can be rendered ineffective and the bolt and nut adjusted should it be found necessary. Lubricant can be supplied to the bearings by means of grease nipples 36 threaded into openings in the base of each of the bearing cup portions 15 although lubricant may be supplied to the bearings in other suitable ways when desired.

During operation of the shackle, the spring 33 serves as an automatic take-up for causing movement of the links 13 and 14 toward each other whenever such movement is permitted by wear occurring in the bearing. Since each pin is of cylindrical character and has cylindrical bearing surface contact with the bearing parts 19 and 20, uniform wear at the ends of the pins and of the wall surfaces 21 and 22 of the bearing parts receiving the pin, will necessarily occur. As this wear occurs, movement of the bearing portions 19 and 20 toward the axis of the pin will be permitted and consequently movement of the bearing parts toward the base of the cup bearing portions 15 on the links will be permitted. Such movement of the bearing parts will automatically occur because the spring 33 will urge the links toward each other and hence the bearing cup portions toward each other along the pins and bearing parts. The semi-cylindrical surfaces 16 and 17 in the bearing cup portion 15 always maintain full surface contact with the bearing parts because such bearing contact is effected by complementary cylindrical surfaces having the same radius of curvature. Additionally the base portions 26 and 27 on the bearing parts will always serve as thrust bearings for the ends of the pins and be maintained in engagement therewith because of the spring 33. It is apparent in a shackle such as that described that the bearing parts can readily be removed and replaced and also that the pins 23 can be replaced if necessary, and that such parts will always operate uniformly for maintaining a tight, although operative, shackle connection. The bearing provided enables the securing of a large bearing contact between the pins, the bearing parts and the cup portion 15.

The construction shown by Fig. 5 is similar to that shown by Fig. 2 insofar as the bearing parts for the pins 23 are concerned but the links intermediate their ends are provided with hub portions 40 and 41 receiving a stiffening sleeve 42. This sleeve tends to more positively maintain the links in parallel relation and more positively prevents side-swaying of the vehicle during rocking movement thereof on the springs. A bolt 43 extending through the hub portions 40 and 41 and through the sleeve 42, has a head 44 at one end engaging the outer end of hub 41, and at its other end is provided with a washer 45 which engages at its outer edges, a coil spring 46 disposed between the washer and the link. A nut 47 on the outer end of the pin is used for maintaining the links together and a key 48 extending through an opening in the pin and through the nut prevents accidental turning of the latter. The spring 46 serves as an automatic take-up for moving the links together in the same manner that the spring 33 operates in the construction shown by Fig. 2.

From the above description it is apparent that a shackle has been provided in which automatic means are provided for taking up play in the parts which would otherwise be present because of wear. Moreover, it is apparent that the bearing parts in each end of the links always have full contact both with the pins and with the bearing cup portions at the ends of the links regardless of any wear in the parts, and that the bearing parts may be replaced if necessary and hence the life of the shackle rendered practically indefinite. It is also apparent that the parts can be manufactured inexpensively and hence the cost of producing the shackle reduced accordingly. Providing a shackle which always maintains an operatively tight connection between the vehicle chassis and the spring is extremely advantageous because it increases the efficiency of operation of the vehicle, avoids undesirable movement of the latter during its rocking movement, and avoids making manual adjustments that usually were necessary with respect to well known shackle constructions. The fact that the bearing contact between the parts is large and always maintained substantially constant regardless of wear in the connection, causes the shackle to be highly efficient in operation for the purposes for which it is utilized.

Although certain forms of the invention have been shown and described, it will be apparent to those skilled in the art that various modifications may be made without departing from the scope of the appended claims.

I claim:

1. A shackle comprising a pair of spaced links having laterally directed openings in the end portions thereof, each opening being defined by converging surfaces, each of which has uniform transverse cross sectional contour to provide a uniform wedging surface, a plurality of bearings in each opening having outer surfaces respectively corresponding to the surfaces defining the opening, and having inner complementary bearing surfaces, a pin disposed in the openings at each end of the links and having surfaces cooperating with the inner bearing surfaces, and means for drawing the links toward each other.

2. A shackle comprising a pair of spaced links having laterally directed openings in the end portions thereof, each opening being defined by converging surfaces, each of which has uniform transverse cross sectional contour to provide a uniform wedging surface, a plurality of bearings in each opening, having outer surfaces respectively corresponding to the surfaces defining the opening, and having inner complementary surfaces, a pin disposed in the openings in each end of the links and having surfaces cooperating with the inner bearing surfaces, and means resiliently urging the links toward each other.

3. A shackle comprising a pair of spaced links having laterally directed openings in the end portions thereof, each opening being defined by converging surfaces, each of which has uniform transverse cross sectional contour to provide a uniform wedging surface, a plurality of bearings in each opening, having outer surfaces respectively corresponding to the surfaces defining the openings, and having inner complementary surfaces, a pin disposed in the openings in each end of the links and having surfaces cooperating with the inner bearing surfaces, and resilient means connecting the links intermediate their ends for resiliently drawing the links toward each other.

4. A shackle comprising a pair of spaced links having laterally directed openings in the end portions thereof, each opening being defined by converging surfaces, each of which has uniform cross sectional contour to provide a uniform wedging surface, a plurality of bearings in each opening having outer surfaces respectively corresponding to the surfaces defining the opening and having inner cylindrical complementary surfaces, a pin disposed in the openings in each end of the links and having cylindrical surfaces cooperating with the cylindrical inner bearing surfaces, and means for drawing the links toward each other.

5. A shackle comprising a pair of spaced links having laterally directed openings in the end portions thereof, each opening being defined by converging surfaces, each of which has uniform transverse cross sectional contour to provide uniform wedging surfaces, a plurality of bearings in each opening having outer surfaces respectively corresponding to the surfaces defining the opening, and having inner complementary surfaces, a pin disposd in the openings in each end of the links and having surfaces cooperating with the inner bearing surfaces, means at the remote ends of the bearings at opposite ends of the pin serving as thrust bearings for the ends of the pins, and means for drawing the links toward each other.

6. A shackle comprising a pair of spaced links having laterally directed openings in the end portions thereof, each opening being defined by converging surfaces, each of which has uniform transverse cross sectional contour, to provide uniform wedging surfaces, a plurality of bearings in each opening, having outer surfaces respectively corresponding to the surfaces defining the openings, and having inner complementary cylindrical surfaces, a pin disposed in the openings at the ends of the links and having cylindrical surfaces corresponding to the cylindrical bearing surfaces, means at the remote ends of the bearings at opposite ends of the pin serving as thrust bearings for the end of the pin, and means for drawing the links toward each other.

7. A shackle comprising a pair of spaced links having openings in the end portions thereof, each of said openings being defined by wall surfaces converging toward one end of the opening, a plurality of bearings in each of the openings, each bearing having an outer surface adapted to cooperate with a wall surface defining the opening, said wall surface and bearing surface conforming regardless of longitudinal movement of the bearing in the opening, a pin extending between the links at each end thereof, having its ends supported in the bearings in such openings, and means for drawing the links toward each other.

8. A shackle comprising spaced links having openings in the ends thereof, each of said openings being defined by cylindrical wall surfaces having angularly related axes, a plurality of bearings mounted in each of the openings and having outer surfaces corresponding to the cylindrical wall surfaces defining the openings, a pin extending between the links at each end and having its ends supported in the bearings, and means for drawing the links toward each other.

9. A shackle comprising spaced links each of which has bearing cup portions at opposite ends, said portions on the respective links at one end of the shackle having their open parts disposed adjacent, the inner side wall surfaces of each cup being defined by surfaces converging toward the base of the cup, a pair of bearings disposed in each bearing portion and having outer surfaces complementary respectively to the inner wall surfaces defining the cup, said cup wall surfaces and the bearing surfaces conforming regardless of movement of the bearings longitudinally toward or away from the base of the cup, a pin extending between the links at each end thereof and having its ends supported in the bearings, and means for drawing the links toward each other.

10. A shackle comprising a pair of spaced links, each of which has cup shaped bearing portions at opposite ends, the bearing cup portions of the respective links at one end of the shackle having their open parts disposed adjacent, the inner side wall of each cup being defined by surfaces converging toward the base of the cup, a plurality of bearings in each cup having outer wall surfaces converging respectively toward the base of the cup, the wall surfaces and bearing surfaces conforming at all times regardless of longitudinal movement of the bearings toward and away from the base of the cup, a pin extending between the links at each end thereof having its ends supported in the bearings, means on said bearings serving as thrust bearings for the ends of the pin, and means for drawing the links toward each other.

11. A shackle comprising a pair of spaced links having laterally directed openings in the end portions thereof, each opening being defined by converging surfaces, each of which has uniform transverse cross-sectional contour, a plurality of distinct and separate bearings disposed in each opening in circumferentially spaced relation and having outer surfaces complementary respectively to the inner converging surfaces in the opening, said converging surfaces in the openings and the outer surfaces on the bearings respectively, conforming regardless of movement of the bearings longitudinally of the opening, a pin extending between the links at each end and having its ends supported in the bearings, and means for drawing the links together.

12. A shackle comprising spaced links, each having laterally directed openings in its ends, the inner side wall of each opening being defined by surfaces converging toward one lateral end of the opening, a pin extending between the ends of the links and projecting into the openings, a bearing element on each end of the pin, and having outer surfaces complementary respectively to the inner wall surfaces defining the side wall of the opening in each link, said surfaces on the pin and link conforming regardless of movement of the pin and bearing element longitudinally in the openings, and means for drawing the links toward each other.

WILLIAM A. FLUMERFELT.